US010789150B2

(12) United States Patent
Keinan (10) Patent No.: US 10,789,150 B2
(45) Date of Patent: Sep. 29, 2020

(54) STATIC ANALYSIS RULES AND TRAINING DATA REPOSITORIES

(71) Applicant: SAP Portals Israel Ltd, Ra'anana (IL)

(72) Inventor: Gilad Keinan, Ra'anana (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 0 days.

(21) Appl. No.: 15/287,747

(22) Filed: Oct. 7, 2016

(65) Prior Publication Data

US 2018/0101465 A1   Apr. 12, 2018

(51) Int. Cl.
*G06F 9/44* (2018.01)
*G06F 11/36* (2006.01)
*G06N 20/00* (2019.01)

(52) U.S. Cl.
CPC ...... *G06F 11/3624* (2013.01); *G06F 11/3604* (2013.01); *G06N 20/00* (2019.01)

(58) Field of Classification Search
CPC .................................................. G06F 11/3624
See application file for complete search history.

(56) References Cited

U.S. PATENT DOCUMENTS

| | | | | |
|---|---|---|---|---|
| 2012/0291022 A1* | 11/2012 | Mehta | ...................... | G06F 8/60 717/176 |
| 2014/0013304 A1* | 1/2014 | Vangala | ................... | G06F 8/75 717/123 |
| 2014/0157239 A1* | 6/2014 | Goetsch | .............. | G06F 11/3604 717/126 |
| 2014/0172760 A1* | 6/2014 | DiCorpo | ............ | G06Q 10/0631 706/12 |
| 2014/0173561 A1* | 6/2014 | Toub | ........................ | G06F 8/71 717/123 |
| 2015/0067652 A1* | 3/2015 | Seto | ..................... | G06F 11/3636 717/125 |
| 2017/0199737 A1* | 7/2017 | Bofferding | ................ | G06F 8/76 |

* cited by examiner

*Primary Examiner* — Hang Pan
(74) *Attorney, Agent, or Firm* — Buckley, Maschoff & Talwalkar LLC (57) ABSTRACT

Various embodiments of systems, computer program products, and methods to provide a static analysis rules repository and a training data repository are described herein. In an aspect, a list of commit metadata associated with historical source code are retrieved from one or more repositories. Commits associated with the list of commit metadata are filtered based on commit types. Further, the filtered commits are analyzed to score the commits based on usage of the commits. Based on scoring, the static analysis rules repository including one or more new rules for the static code analysis and the training data repository including source code examples for the software source coding are provided.

21 Claims, 5 Drawing Sheets

```
22  22   @@ -22,6 +22,7 @@ import javax.ws.rs.core.HttpHeaders;
23  23   import javax.ws.rs.core.Response;
24  24   import javax.ws.rs.core.UriInfo;
    25  +import org.apache.commons.lang3.StringEscapeUtils;
25  26   import org.apache.cxf.jaxrs.ext.MessageContext;
26  27   import org.slf4j.Logger;
27  28   import org.slf4j.LoggerFactory;
248 249  @@ -248,7 +249,7 @@ public class OAuthFacade extends BaseService {
249 250      String str = getRestTemplate().postForObject(url, null, String.class, uriVariables);
250 251
251      -    return Response.ok(str).build();                              ⟵ 310
    252  +   return Response.ok(StringEscapeUtils.escapeJava(str)).build();  ⟵ 320
252 253    } catch (Exception ex) {
253 254      this.handleException(ex);
254 255    }
```

STATIC ANALYSIS RULES AND TRAINING DATA REPOSITORIES

BACKGROUND

For debugging source code, static analysis tools may be used to detect errors that are often missed when using other tools alone. The static analysis tools may operate on static code (i.e., source code that is not running during the analysis process) using a set of static rules. Therefore, new issues are manually analyzed to update the static analysis tool with a new rule. Further, not all static analysis tools may have the same rule set, because each rule set may be generated by the organization's experts or from a brainstorming of the technologies a product is using. Also, during development of the source code, developers may have to choose an approach such as code reviewing, querying a number of databases and the like to fix an issue (e.g., security issue, performance issue and the like).

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide static analysis rules and training data repositories are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (retrieving, filtering, determining, storing, and so on) may be performed by a hardware device (e.g., computing system), even if the action may be authorized, initiated or triggered by a user, or even if the hardware device is controlled by a computer program, software, firmware, and the like. Further, it is to be understood that the hardware device may be operating on data, even if the data may represent concepts or real-world objects, thus the explicit labeling as "data" as such may be omitted.

Figure 1:
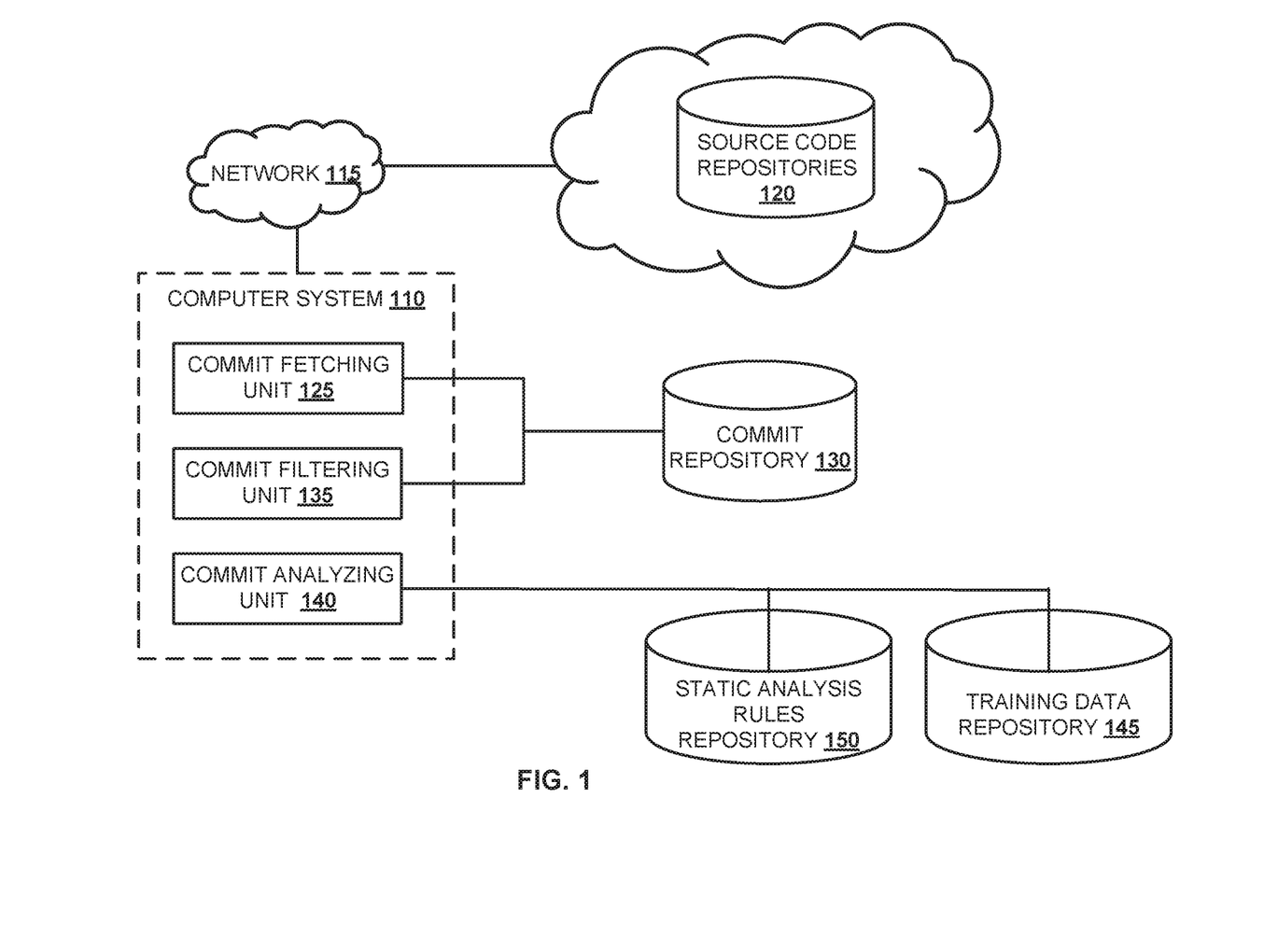
FIG. 1 is a block diagram of a computing environment, according to one embodiment.

FIG. 1 is a block diagram of a computing environment, according to one embodiment. The computing environment may include computer system 110 connected to one or more source code repositories (e.g., 120) through a network (e.g., 115). In one example, the one or more source code repositories (e.g., 120) may include source code file archives and web hosting facility, where large amount of historical source code associated with software applications are stored for sharing purposes, either publicly or privately. The source code can be referred as collection of computer instructions specifying actions to be performed by the computer system 110 (e.g., to execute a software application). The source code repositories (e.g., 120) may be used by open-source projects (e.g., to inspect, modify and enhance) and other multi-developer projects to handle various versions of software applications. Examples for the source code repositories include, but are not limited to GitHub®, Bitbucket®, ProjectLocker®, CloudForge®, Sourceforge®, and Launchpad®.

In one exemplary embodiment, the computer system 110 may include components such as commit fetching unit 125, commit filtering unit 135, and commit analyzing unit 140 to generate one or more new rules for static code analysis and improvise software source coding. At execution phase, the commit fetching unit 125 may fetch a list of commit metadata from the source code repositories (e.g., 120). In one exemplary embodiment, a trigger to fetch the list of commit metadata can be generated when there exists any modifications in the source code repositories or at regular time intervals. In one example, the source code repositories (e.g., 120) from which the list of commit metadata to be fetched can be preconfigured by an administrator at a preparation phase. A commit can be referred as making of a set of tentative changes permanent in the source code. The commit metadata includes information describing commit such as, but not limited to, a commit message, a change identifier, a commit type, and code difference between prior and after source code changes. Further, the fetched commit metadata can be stored in commit repository 130.

In one exemplary embodiment, the filtering unit 135 may filter commits associated with the list of commit metadata based on commit types. The commit types can be, but not limited to, functional types and non-functional types (e.g., security types and performance types). The commits may be filtered based on at least one of source control plugins and user input. In one example, the user input can be preconfigured by the administrator as a regular expression (e.g., a sequence of symbols and characters expressing a string or pattern to be searched) at the preparation phase. Also, the source control plugins or bug tracking plugins can be preconfigured by the administrator at the preparation phase. The source control plugins can be, but not limited to JIRA®, Apache Subversion® (SVN®) and Perforce®, which are used to obtain details of the commit to analyze.

In one exemplary embodiment, the commit analyzing unit 140 analyze the filtered commits to perform at least one of generating rules for static code analysis and improvising software source coding. For example, the commits are analyzed to determine whether a commit is a good commit or not. Based on the analysis, new rules for static code analysis are generated and a list of preferable and non-preferable source code examples are presented to improvise the software source coding. Further, the examples for software source coding may be stored in training data repository 145 and the new rules may be stored in static analysis rules repository 150. Therefore, by analyzing the historic commits, suggestions for good practice fragments of code while developing and/or afterwards in a code scanning can be provided. Further, updated rules are generated for static code analysis tools to check security, performance or other quality measurements. Thereby the new rules are dynamically updated in the static code analysis tools for finding new vulnerabilities.

In one example embodiment, the components (e.g., the commit fetching unit 125, the filtering unit 135 and the analyzing unit 140) can be included in the computer system 110 and/or in different computer systems. As will be further described with respect to FIG. 4, the computer system can include one or more processors. For example, the computer system can be a computer, server, workstation, mobile device, embedded system or other device having at least one processor and memory. The computer system can include a communication port or input/output device for communicating over wired or wireless communications.

Figure 2:
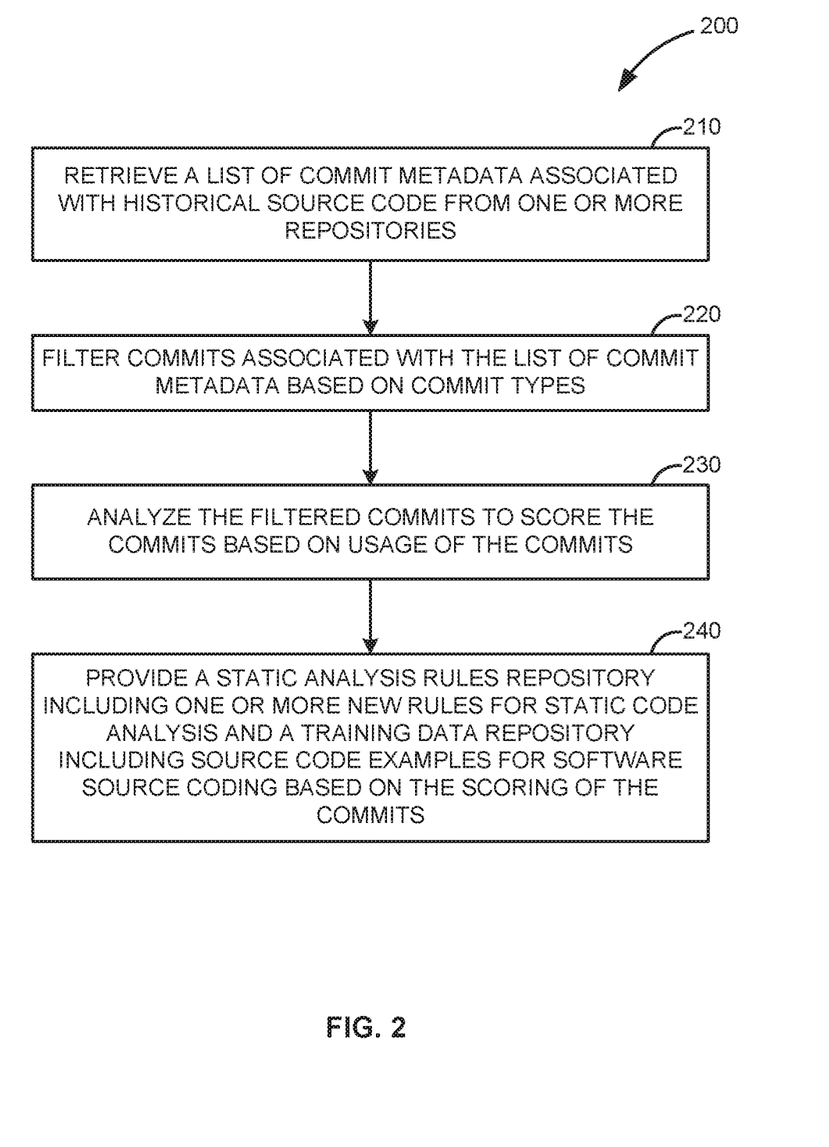
FIG. 2 is a flow diagram illustrating an example process to provide static analysis rules repository and training data repository, according to an embodiment.

FIG. 2 is a flow diagram illustrating example process 200 to provide static analysis rules repository and training data repository for storing rules according to an embodiment. The static analysis rules repository and training data repository are provided for static code analysis and improvising software source coding, respectively. At 210, a list of commit metadata associated with historical source code is retrieved from one or more source code repositories. In one example embodiment, a list of available source code repositories are obtained. The source code repositories includes cloud source code repositories storing commits and associated commit metadata. Further, the source code repositories from which the list of commit metadata is fetched is preconfigured by an administrator. For example, the source code repositories can be cloud repositories such as, but not limited to GitHub®, Bitbucket®, ProjectLocker®, CloudForge®, Sourceforge®, and Launchpad®. The commit metadata includes information describing commit such as, but not limited to a commit message, a change identifier, a commit type, and code difference between prior and after source code changes. In one example embodiment, retrieving the list of commit metadata includes at least one of retrieving the list of commit metadata at regular time intervals and retrieving the list of commit metadata when there is a modification in the source code repositories.

For example, when GitHub® repository is preconfigured for fetching the list of commit metadata, the GitHub® is read to retrieve the list of public repositories for fetching commit metadata using application programming interface (API) such as https://developer.github.com/v3/repos/#list-all-public repositories. Further, the API can be called through https://api.github.com/repositories, for instance. Consider a repository called "calendar_builder" is found upon iterating the public repositories. Further, the commit metadata and commits are retrieved using https://developer.github.com/v3/repos/commits/GET/repos/:owner/:repo/commits and https://api.github.com/repos/collectiveidea/calendar_builder/commits, for instance. Further, the retrieved list of commit metadata is stored in a commit repository.

At 220, commits associated with the list of commit metadata are filtered based on commit types. The commit types describe quality types of the commit (e.g., which bug or issue type the commit fixed) such as, but not limited to, a functional type and a non-functional type (e.g., a security type and a performance type). In one exemplary embodiment, the commits are filtered based on at least one of source control plugins and user input. The user input can be used to filter a specific string cross-site scripting (XSS issue). Also, commit identifier can be integrated with the source control plugin JIRA® to retrieve information for filtering commits. For example, when the administrator provides the input to filter commits or fixes related to "proxy", the commits including a tag "proxy" are grouped together. A commit with a message "added default id to proxy" is grouped for the filtering criteria "proxy", for instance. Thereby, the commits are filtered or grouped based on the issues that the commits fix.

At 230, the filtered commits are analyzed to score the commits based on usage of the commits. In one example, machine learning algorithms can be used to analyze the commits. In other words, the machine learning algorithms may be used to analyze the filtered commits using a training data of good and bad examples for software source coding. Machine learning is broadly concerned with developing algorithms and techniques that allow computer systems to learn. One way the computer systems can learn is by analyzing massive amounts of data (e.g., commits) and attempting to discover rules or patterns that explain how the data was generated. Further, machine learning is evolved from the study of pattern recognition and computational learning theory in artificial intelligence. Also, machine learning may focus in prediction-making through the use of computers. Examples of machine learning algorithms can be, but are not limited to linear regression, logistic regression, and decision tree.

In one exemplary embodiment, a commit can be considered as a good commit when the commit is incorporated in majority of source code fragments. In another exemplary embodiment, the commit is considered as good or not can be determined if the commit was override with another commit. In other words, if the commit is override with another commit, the commit is considered as not a good commit. In yet another exemplary embodiment, a voting system can be provided for the users to state whether the commit is good or not. Further, the commits are scored based on the analysis of the commits. For example, when the commits used frequently, the score of the commit is increased. When the commit was override by another commit, the score of the commit is decreased. Also, when the commit already exists in a training data repository, the score of the commit is increased because of usage of the commit. Furthermore, the updated scores of the commits can be stored in a repository.

At 240, static analysis rules repository is provided to store one or more new rules for static code analysis and training data repository is provided to store source code examples for software source coding based on the scoring of the commits. Since the software developers are providing with commits' scores, the software developers can rely on high scored source code (i.e., commits) for issues such as security or performance related issues and focus on the real problem of logic in software source coding. Also, the software developers can avoid returning to the source code to fix the bug because examples for good approach for source code is provided to the software developers during development of the source code. Therefore, a good training dataset for the machine learning can be introduced to recognize which commit is actually a good one to use and which is not. Further, a new extension for integrated development environment (IDE) can be integrated to assist software developers' work with software source coding.

Further, static analysis is often used by software developers to provide information about computer software while applying static considerations (i.e., without executing a computer software application). In one exemplary embodiment, the new rules are established for static code analysis based on the scores of the commits and relevancy of the commits. For example, a specific commit can be determined as a relevant commit or an irrelevant commit to make a rule out of the relevant commit for updating static code analysis. Further, the new rules may be persisted in the static analysis rules repository for comparing with a current static code analysis tool to constantly updating the current set of rules.

Figure 3:
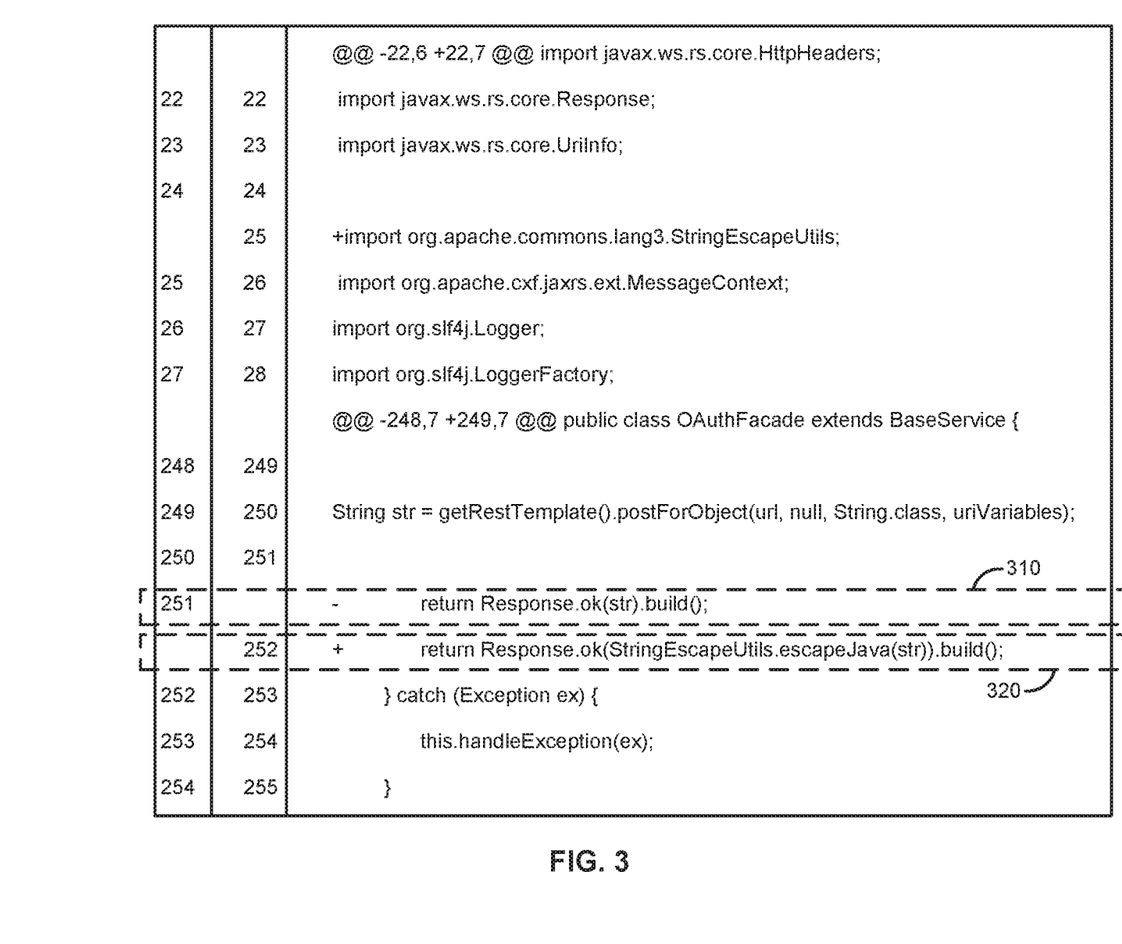
FIG. 3 illustrates an example source code to illustrate the process of FIG. 2, according to an embodiment.

FIG. 3 illustrates an example source code to illustrate the process of FIG. 2, according to an embodiment. In an example, consider 100 different commit metadata retrieved from source code repositories. The commits are filtered based on commit types (e.g., security fix commit, performance fix commit, function fix commit and the like) using the commit metadata. An example of a security issue fix commit is depicted in FIG. 3. The commit metadata is "SOC-1155. Fix fortify issues for cone api. Fix for XSS scripting #77", from which the type (e.g., security issue) of the commit is determined. The commit in FIG. 3 includes code fragment depicting source code change. For example, a line "Return Response.ok(str).build( )" (e.g., 310) is deleted and a line "StringEscapeUtils.escapeJava(string)" (e.g., 320) is added to fix a security issue.

In one exemplary embodiment, the commit is analyzed to determine whether the commit is a good commit or a bad commit using a machine learning algorithm. When the commit is a good commit, a score of the commit increased and a new rule can be established with a regular expression. For example, when a software developer prints something to log in JAVA®, a standard library is used to encode a string "StringEscapeUtils.escapeJava(string)." Consider 100 different commits found on line similar to "Return Response.ok(str).build( )." 80% of software developers change it to "Return Response.ok(StringEscapeUtils.escapeJava(str)).build( )" with a commit message of fixing a security issue and 20% of the software developers leave it as is. Therefore, from the analysis, a suggestion can be made for updating a static code analysis tool with new rules.

Figure 4:
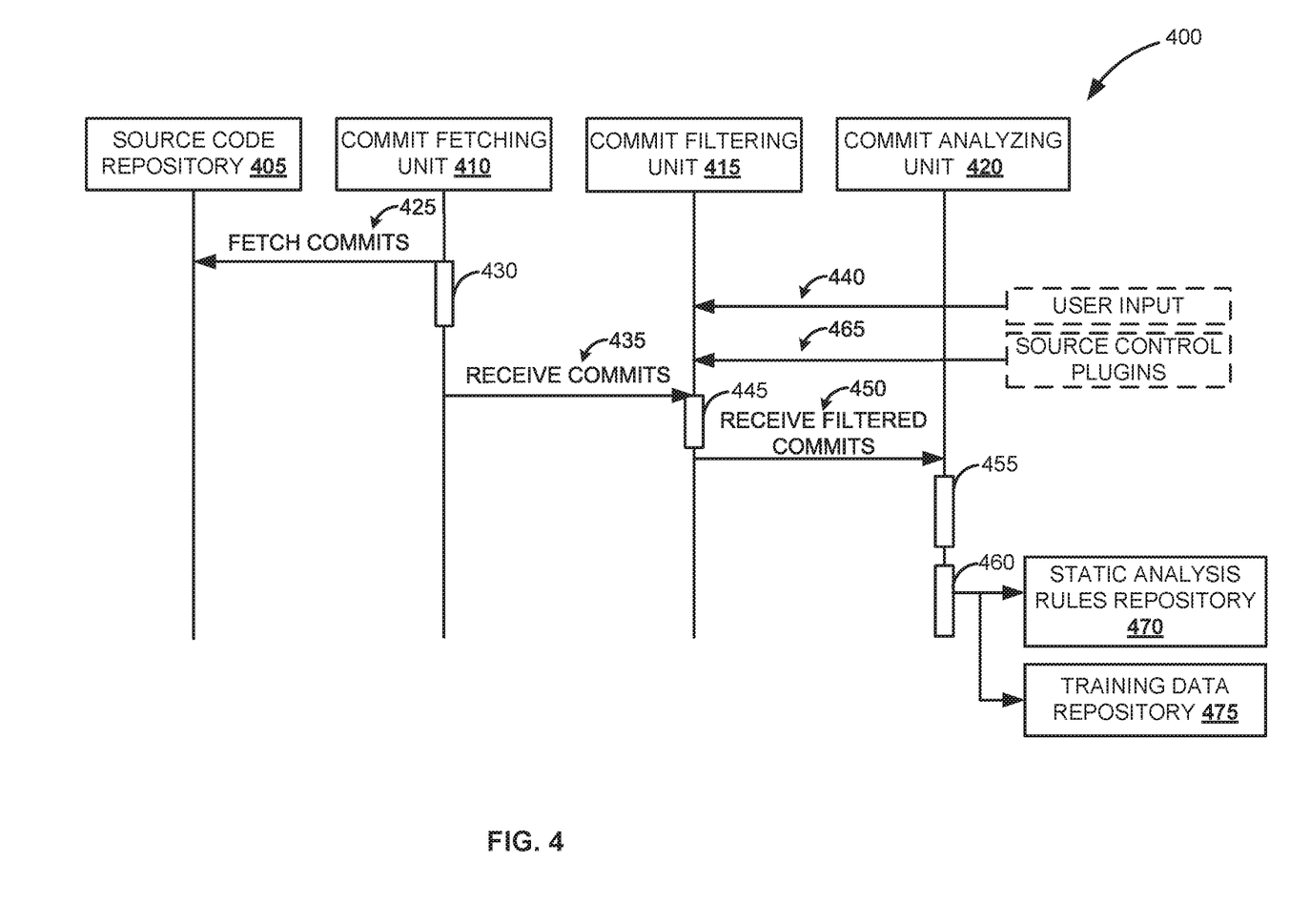
FIG. 4 is a sequence diagram illustrating an exemplary data flow between a commit fetching unit, a commit filtering unit and a commit analyzing unit, according to an embodiment.

FIG. 4 is a sequence diagram illustrating exemplary data flow 400 between commit fetching unit 405, commit filtering unit 410 and commit analyzing unit 415, according to an embodiment. The sequence diagram represents the interactions and the operations involved between the commit fetching unit 405, the commit filtering unit 410 and the commit analyzing unit 415. The vertical lines of the commit fetching unit 405, the commit filtering unit 410 and the commit analyzing unit 415 represent the processes that may exist simultaneously. The horizontal arrows (e.g., 425, 435, 440, 450 and 465) represent the process steps between the vertical lines representing their respective process objects (e.g., the commit fetching unit 405, the commit filtering unit 410 and the commit analyzing unit 415). Activation boxes (e.g., 430, 445, 455 and 460) between the horizontal arrows represent the processes performed in the respective process object.

At 425, a list of commit metadata and commits associated with historical source code is retrieved from source code repository 405. The source code repository 405 includes cloud source code repositories storing commits and associated commit metadata. For example, the source code repositories can be cloud repositories such as, but not limited to GitHub®, Bitbucket®, ProjectLocker®, CloudForge®, Sourceforge®, and Launchpad®. The commit metadata includes information describing commit such as, but not limited to a commit message, a change identifier, a commit type, and code difference between prior and after source code changes. Further, the fetched commit metadata and the commits are stored in a commit repository (e.g., at 430).

At 435, the commit filtering unit 415 receives the fetched commits. Further, the commit filtering unit 415 filters the commit metadata based on commit types (e.g., at 445). The commit types describe quality types of the commit (e.g., which bug or issue type the commit fixed) such as, but not limited to, a functional type and a non-functional type (e.g., a security type and a performance type). In one exemplary embodiment, the commits are filtered based on at least one of source control plugins (e.g., 465) and user input (e.g., 440).

At 450, the filtered commits are received at the commit analyzing unit 420. The commit analyzing unit 420 analyzes the commits to score the commits based on usage of the commits (e.g., at 455). In one exemplary embodiment, a commit can be considered as a good commit when the commit is incorporated in majority of source code fragments. In another exemplary embodiment, the commit is considered as good or not can be determined if the commit was override with another commit. In other words, if the commit is override with another commit, the commit is considered as not a good commit. In yet another exemplary embodiment, a voting system can be provided for the users to state whether the commit is good or not. Further, the commits are scored based on the analysis of the commits. For example, when the commits used frequently, the score of the commit is increased. When the commit was override by another commit, the score of the commit is decreased. Also, when the commit already exists in a training data repository, the score of the commit is increased because of usage of the commit. Furthermore, the updated scores of the commits can be stored in a repository. At 460, static analysis rules repository 470 and training data repository 475 are provided. The static analysis rules repository 470 includes updated rules for static code analysis and the training data repository 475 includes source code examples for software source coding based on the scoring of the commits.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
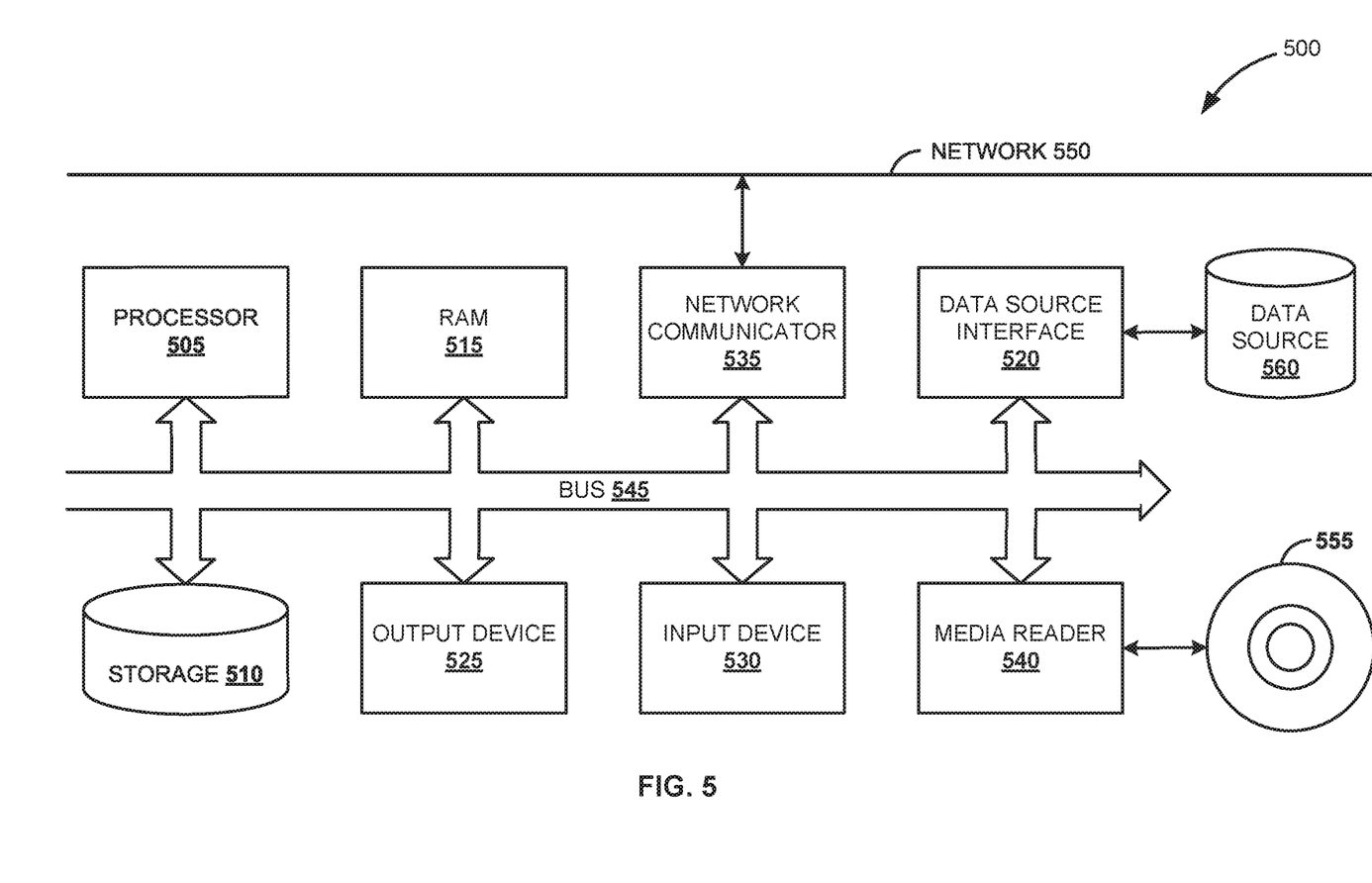
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A computing system to provide static code analysis rules to a static analysis rules repository and source code examples to a training data repository, the system comprising:
at least one processor; and
one or more memory devices communicative with the at least one processor, wherein the one or more memory devices store instructions that cause the at least one processor to:
retrieve, at a commit fetching unit, a list of commit metadata associated with historical source code from one or more source code repositories;
filter, at a commit filtering unit, commits associated with the list of commit metadata based on commit types;
analyze, at a commit analyzing unit, the filtered commits to score the commits based on usage of the commits, where each respective score indicates an historic good practice performance for a respective commit, each respective commit score based on at least one of a determination of whether the commit overrides another commit or a determination of whether the commit already exists in the training data repository;
generate one or more of the static code analysis rules based on the commits score;
provide the one or more static code analysis rules to the static analysis rules repository;
generate a list of the source code examples based on the commits score;
provide listed source code examples to the training data repository; and
introduce a training data set containing one or more of the listed source code examples to a prediction-making machine learning algorithm to train the machine learning algorithm to recognize when a particular commit should be used during source code development.

2. The computing system of claim 1, wherein retrieving the list of commit metadata comprises at least one of retrieving the list of commit metadata at regular time intervals and retrieving the list of commit metadata when there is a modification in the one or more source code repositories.

3. The computing system of claim 1, wherein the commit metadata comprise at least one of a commit message, a change identifier, a commit type and code difference between prior and after source code changes.

4. The computing system of claim 1, wherein filtering the commits in the list of commit metadata comprises filtering the one or more commits based on at least one of source control plugins and user input.

5. The computing system of claim 1, wherein the one or more repositories comprises one or more cloud source code repositories storing the commits and associated commit metadata.

6. The computing system of claim 4, wherein the source control plugins, the user input and one or more repositories are preconfigured at a preparation phase.

7. The computing system of claim 1, wherein each respective commit score is further based, at least in part, on votes manually provided by users as to whether a particular commit comprises a good commit.

8. A computer implemented method to provide static code analysis rules to a static analysis rules repository and source code examples to a training data repository, the method comprising:

retrieving, at a commit fetching unit, a list of commit metadata associated with historical source code from one or more source code repositories;
filtering, at a commit filtering unit, commits associated with the list of commit metadata based on commit types;
analyzing, at a commit analyzing unit, the filtered commits to score the commits based on usage of the commits, where each respective score indicates an historic good practice performance for a respective commit, each respective commit score based on at least one of a determination of whether the commit overrides another commit or a determination of whether the commit already exists in the training data repository;
generating one or more of the static code analysis rules based on the commits score;
providing the one or more static code analysis rules to the static analysis rules repository;
generating a list of the source code examples based on the commits score;
providing listed source code examples to the training data repository; and
introducing a training data set containing one or more of the listed source code examples to a prediction-making machine learning algorithm to train the machine learning algorithm to recognize when a particular commit should be used during source code development.

9. The computer implemented method of claim 8, wherein retrieving the list of commit metadata comprises at least one of retrieving the list of commit metadata at regular time intervals and retrieving the list of commit metadata when there is a modification in the one or more source code repositories.

10. The computer implemented method of claim 8, wherein the commit metadata comprise at least one of a commit message, a change identifier, a commit type and code difference between prior and after source code changes.

11. The computer implemented method of claim 8, wherein filtering the commits in the list of commit metadata comprises filtering the one or more commits based on at least one of source control plugins and user input.

12. The computer implemented method of claim 8, wherein the source code examples are generated using machine learning algorithms.

13. The computer implemented method of claim 8, wherein the one or more repositories comprises one or more cloud source code repositories to store the commits and associated commit metadata.

14. The computer implemented method of claim 11, wherein the source control plugins, the user input and one or more repositories are preconfigured at a preparation phase.

15. A non-transitory computer readable storage medium storing instructions, which when executed by a computer cause the computer to:
retrieve a list of commit metadata associated with historical source code from one or more source code repositories;
filter commits associated with the list of commit metadata based on commit types;
analyze the filtered commits to score the commits based on usage of the commits, where each respective score indicates an historic good practice performance for a respective commit, each respective commit score based on at least one of a determination of whether the commit overrides another commit or a determination of whether the commit already exists in the training data repository;

generate one or more of the static code analysis rules based on the commits score;
provide the one or more static code analysis rules to the static analysis rules repository;
generate a list of the source code examples based on the commits score;
provide listed source code examples to the training data repository; and
introduce a training data set containing one or more of the listed source code examples to a prediction-making machine learning algorithm to train the machine learning algorithm to recognize when a particular commit should be used during source code development.

16. The non-transitory computer-readable medium of claim 15, retrieving the list of commit metadata comprises at least one of retrieving the list of commit metadata at regular time intervals and retrieving the list of commit metadata when there is a modification in the one or more source code repositories.

17. The non-transitory computer-readable medium of claim 15, wherein the commit metadata comprise at least one of a commit message, a change identifier, a commit type and code difference between prior and after source code changes.

18. The non-transitory computer-readable medium of claim 15, wherein filtering the commits in the list of commit metadata comprises filtering the one or more commits based on at least one of source control plugins and user input.

19. The non-transitory computer-readable medium of claim 15, wherein the source code examples are generated using machine learning algorithms.

20. The non-transitory computer-readable medium of claim 15, wherein the one or more repositories comprises one or more cloud source code repositories storing the commits and associated commit metadata.

21. The non-transitory computer-readable medium of claim 18, wherein the source control plugins, the user input and one or more repositories are preconfigured at a preparation phase.

* * * * *